United States Patent [19]

Degnan et al.

[11] Patent Number: 5,075,269

[45] Date of Patent: Dec. 24, 1991

[54] PRODUCTION OF HIGH VISCOSITY INDEX LUBRICATING OIL STOCK

[75] Inventors: Thomas F. Degnan, Moorestown, N.J.; Ernest W. Valyocsik, Yardley, Pa.

[73] Assignee: Mobil Oil Corp., Fairfax, Va.

[21] Appl. No.: 484,283

[22] Filed: Feb. 26, 1990

Related U.S. Application Data

[63] Continuation-in-part of Ser. No. 285,378, Dec. 15, 1988, abandoned, which is a continuation of Ser. No. 118,081, Nov. 9, 1987, abandoned.

[51] Int. Cl.$^5$ .............................................. B01J 29/04
[52] U.S. Cl. ...................................... 502/77; 502/71; 423/328
[58] Field of Search ................ 502/77, 71; 423/328 T

[56] References Cited

U.S. PATENT DOCUMENTS

| | | | |
|---|---|---|---|
| 4,584,286 | 4/1986 | Valyocsik | 502/62 |
| 4,585,746 | 4/1986 | Valyocsik | 502/62 |
| 4,585,747 | 4/1986 | Valyocsik | 423/328 T |
| 4,657,662 | 4/1987 | Valyocsik | 208/111 |

Primary Examiner—Helane E. Myers
Assistant Examiner—William C. Diemler
Attorney, Agent, or Firm—Alexander J. McKillop; Charles J. Speciale; Dennis P. Santini

[57] ABSTRACT

Waxy hydrocarbon oils, e.g., of petroleum origin, are catalytically dewaxed to produce high viscosity index lubricating oil stocks utilizing as catalyst acidic zeolite ZSM-48.

11 Claims, 6 Drawing Sheets

FIG.I

PRIOR ART

PRODUCTION OF HIGH VISCOSITY INDEX LUBRICATING OIL STOCK

CROSS REFERENCE TO RELATED APPLICATIONS

This is a continuation-in-part application of commonly assigned copending U.S. patent application Ser. No. 285,378 filed Dec. 15, 1988, now abandoned, which in turn is a continuation of U.S. patent application Ser. No. 118,081, filed Nov. 9, 1987.

BACKGROUND OF THE INVENTION

This invention is concerned with the manufacture of high quality lubricating oils, and in particular with lubricating oils derived from petroleum distillate fractions. It is especially directed to the preparation of low pour point lubricating oils that have a high V.I. (V.I. will be used herein to denote "viscosity index") from crude oils of high wax content. This invention is specifically directed to catalytically dewaxing a waxy distillate lubricating oil utilizing as catalyst the zeolite ZSM-48, optionally associated with a hydrogenation component, to obtain a lubricating oil of low pour point and high V.I.

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structure types. This complexity and its consequences are referred to in well known treatises such as "Petroleum Refinery Engineering," by W. L. Nelson, McGraw Hill Book Company, Inc., New York, N.Y., 1958 (Fourth Edition).

In general, the basic premise in lubricant refining is that a suitable crude oil, as shown by experience or by assay, contains a quantity of lubricant stock having a predetermined set of properties such as appropriate viscosity, oxidation stability and maintenance of fluidity at low temperatures. The process of refining to isolate that lubricant stock consists of a set of subtractive unit operations which removes the unwanted components. The most important of these unit operations include distillation, solvent refining and dewaxing which basically are physical separation processes in the sense that if all the separated fractions were recombined one would reconstitute the crude oil.

A refined lubricant stock may be used as such as a lubricant, or it may be blended with another refined lubricant stock having different properties. Or, the refined lubricant stock, prior to use as a lubricant, may be compounded with one or more additives which function, for example, as antioxidants, extreme pressure additives and V.I. improvers.

For the preparation of a high grade distillate lubricating oil stock, the current practice is to vacuum distill an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, sulfolane or chlorex, which is selective for aromatic hydrocarbons, and which removes undesirable components. The raffinate from solvent refining is then dewaxed, for example, by admixing with a solvent such as a blend of methyl ethyl ketone and toluene. The mixture is chilled to induce crystallization of the paraffin waxes which are then separated from the raffinate. Sufficient quantities of wax are removed to provide the desired pour point for the raffinate.

Other processes such as hydrofinishing or clay percolation may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines which are subject to wide variations in temperature. This Index indicates the range of change of viscosity with temperature. A high viscosity index of 100 indicates an oil which resists becoming viscous at low temperature or becoming thin at high temperatures. Measurement of the Saybolt Universal Viscosity of an oil at 100° and 210° F., and referral to correlations, provides a measure of the V.I. of the oil. For purposes of the present invention, whenever V.I. is referred to it is meant the V.I. as noted in the Viscosity Index tabulations of the ASTM (D567), published by ASTM, 1916 Race St., Philadelphia 3, Pa., or equivalent.

To prepare high V.I. automotive and aircraft oils, the refiner usually selects a crude oil relatively rich in paraffinic hydrocarbons since experience has shown that crudes poor in paraffins, such as those commonly termed "naphthene- base" crudes, yield little or no refined stock having a V.I. above about 40. Suitable stocks for high V.I. oils, however, also contain substantial quantities of waxes which result in solvent-refined lubricating oil stocks of high pour point. Thus, in general, the refining of crude oil to provide acceptably high V.I. distillate stocks ordinarily includes dewaxing to reduce the pour point.

In recent years, catalytic techniques have become available for dewaxing of petroleum stocks. A process of that nature developed by British Petroleum is described in *The Oil and Gas Journal*, date Jan. 6, 1975, at pages 69-73. See also, U.S. Pat. No. 3,668,113.

U.S. Pat. No. Re. 28,398 (of original U.S. Pat. No. 3,700,585) describes a process for catalytic dewaxing employing a catalyst comprising zeolige ZSM-5. Such a process combined with catalytic hydrofinishing is described in U.S. Pat. No. 3,894,938. U.S. Pat. No. 3,755,138 describes a process for mild solvent dewaxing to remove high quality wax from a lube stock which is then catalytically dewaxed to specification pour point. The entire contents of these patents are incorporated by reference herein.

It is interesting to note that catalytic dewaxing, unlike prior-art dewaxing processes, although subtractive, is not a physical separation process but rather depends on chemically transforming the straight chain and other waxy paraffins to non-wax materials. The process, however, is more economical and thus of industrial interest even though at least some loss of saleable wax is inherent. Commercial interest in catalytic dewaxing is evidence of the need for more efficient refinery processes to produce low pour point lubricants.

SUMMARY OF THE INVENTION

It has now been found that the catalytic dewaxing of a distillate petroleum fraction, e.g., one boiling within the approximate range of from about 450° to about 1050° F., is advantageously achieved by utilizing acidic zeolite ZSM-48 as catalyst in the operation.

The recovered dewaxed oil so produced has a V.I. considerably higher than that obtained with ZSM-5 catalyst described in the aforementioned prior art. The zeolite utilized in the process of this invention is in the hydrogen form and can be employed in conjunction with a hydrogenation component such as platinum, palladium, zinc, and the like, in the presence of hydrogen.

Accordingly, provided herein is a process for catalytically dewaxing a waxy hydrocarbon oil to provide a lubricating oil of high viscosity index which comprises contacting said waxy hydrocarbon oil under catalytic dewaxing conditions with a catalyst comprising acidic zeolite ZSM-48 which has been prepared with a linear diquaternary ammonium compound as the directing agent.

Also provided herein are a silico-crystal ZSM-48 prepared with an organic linear diquaternary ammonium compound as the directing agent and having a platelet crystal morphology, and a silico-crystal ZSM-48 prepared with an organic linear diquaternary ammonium compound as the directing agent and having an irregular crystal morphology.

DESCRIPTION OF THE PREFERRED EMBODIMENTS

Figure 1:
FIG. 1 is a photomicrograph of about 3000× magnification illustrating the crystal morphology of prior art ZSM-48 prepared with a diamine directing agent.

The catalyst composition useful in the process of this invention comprises acidic zeolite ZSM-48. This catalyst and a method for its preparation are described in each of U.S. Pat. Nos. 4,375,573, 4,397,827, 4,448,675 and 4,423,021. The crystal composition of the as-synthesized zeolite ZSM-48 can be identified, in terms of moles of anhydrous oxides per 100 moles of silica, as follows:

(0.01 to 10)$R_2O$:(0.1 to 10)$M_{2/n}O$:(0 to 4)$Me_2O_3$: (100)$SiO_2$ wherein R is a cation derived from an organic directing agent as more fully described, M is a cation having the valence n and $Me_2O_3$ is an oxide of a trivalent metal, e.g., aluminum, titanium, iron, chromium, zirconium, vanadium, molybdenum, arsenic, antimony, manganese, gallium, germanium, boron, etc., or combination thereof, and wherein the composition is characterized by the distinctive X-ray diffraction pattern as shown in Table I below.

In accordance with the synthesis method of U.S. Pat. No. 4,397,827, the organic directing agent is selected to be a mixture of a $C_{2-12}$, and preferably a $C_{3-5}$, alkylamine and a tetramethyl ammonium compound. The original cations can be replaced by a wide variety of other cations according to techniques well known in the art. Typical replacing cations include hydrogen, ammonium and metal cations, including mixtures of the same. Of the replacing metallic cations, particular preference is given to cations of metals such as rare earth metals, manganese, calcium, as well as metals of Group II of the Periodic Table, e.g., zinc, and Group VIII of the Periodic Table, e.g., nickel, platinum and palladium. Typical ion exchange techniques would be to contact the zeolite with a salt of the desired replacing cation. Although a wide variety of salts can be employed, particular preference is given to chlorides, nitrates and sulfates.

Representative ion-exchange techniques are disclosed in a wide variety of patents including U.S. Pat. Nos. 3,140,249, 3,140,251 and 3,140,253.

Following contact with a solution of the desired replacing cation, the ZSM-48 is then preferably washed with water and dried at a temperature ranging from 150° F. to about 600° F. and thereafter calcined in air or other inert gas at temperatures ranging from about 500° F. to 1500° F. for periods of time ranging from about 1 to about 48 hours or more.

The X-ray diffraction pattern of ZSM-48 has the significant lines shown in Table 1 and is further characterized by the fact that it exhibits a single line within the range of 11.8±0.2 Angstrom units. The crystal does not have more than one X-ray diffraction line at 11.8±0.2 Angstrom units. The presence of only a single line at the indicated spacing structurally distinguishes the instant material from closely related materials such as ZSM-12 (U.S. Pat. No. 3,832,449) which has a doublet (two lines) at 11.8±0.2 Angstrom units and high silica ZSM-12 (U.S. Pat. No. 4,104,294) which also exhibits a doublet at 11.8±0.2 Angstrom units.

TABLE 1

| Characteristic Lines of ZSM-48* | |
|---|---|
| d(A) | Relative Intensity (I/I$_o$) |
| 11.8 ± 0.2 | S |
| 10.2 ± 0.2 | W-M |
| 7.2 ± 0.15 | W |
| 4.2 ± 0.08 | VS |
| 3.9 ± 0.08 | VS |
| 3.6 ± 0.06 | W |
| 3.1 ± 0.05 | W |
| 2.85 ± 0.05 | W |

*In the calcined, sodium-exchanged form.

These values were determined by standard techniques. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, 100 I/$I_o$, where $I_o$ is the intensity of the strongest line or peak, and d (obs.), the interplanar spacing in A corresponding to the recorded lines, were calculated. In Table 1 the relative intensities are given in terms of the symbols W=weak, VS=very strong, M=medium and W-S=weak-to-strong (depending on the cationic form). Ion exchange of the sodium ion with cations reveals substantially the same pattern with some minor shifts in interplanar spacing and variation in relative intensity. Other minor variations can occur depending on the silicon to aluminum ratio of the particular sample as well as if it has been subjected to thermal treatment.

Employing the procedure described in U.S. Pat. No. 4,397,827, Zeolite ZSM-48 can be obtained from a crystallization reaction medium containing a source of silica, a mixture of a $C_{2-12}$ alkylamine, and a tetramethyl ammonium compound as the directing agent R, a source of $M_{2/n}O$, e.g., an alkali metal oxide or source thereof such as sodium silicate, alkali salt, or alkali hydroxide and optionally, a source of metal oxide(s) $Me_2O_3$ or source thereof such as alumina gel, aluminum sulfate, iron sulfate, zirconyl chloride, gallium oxide, germania, titanyl chloride, boria, vanadia, chromia, molybdena, etc. and water, and preferably having a composition, expressed in terms of mole ratios of oxides, falling within the following ranges:

| REACTANTS | BROAD | PREFERRED |
|---|---|---|
| $Me_2O_3/SiO_2$ | 0 to 0.08 | 0 to 0.02 |
| $M_{2/n}O/SiO_2$ | 0.01 to 1.0 | 0.1 to 0.5 |
| $R_2O/SiO_2$ | 0.005 to 0.5 | 0.005 to 0.25 |
| $OH^-/SiO_2$ | 0.01 to 0.5 | 0.05 to 0.2 |
| $H_2O/SiO_2$ | 10 to 200 | 20 to 100 | and maintaining the mixture at 80°-200° C. until crystals of the zeolite are formed. The molar ratio of $C_{2-12}$ alkylamine to tetramethyl ammonium compound is not narrowly critical and can range from 1:1 to 10:1. The tetramethyl ammonium compound can include the hydroxide or halide with the chloride being particularly preferred. Preferably, crystallization is carried out under pressure in an autoclave or static bomb reactor, at 80° to 200° C. with, or without, seeding. Thereafter, the crystals are separated from the liquid and recovered.

The catalytic activity of ZSM-48 synthesized in the foregoing manner is relatively low for some types of conversions including the dewaxing of lube range hydrocarbons. The effectiveness of a zeolite depends on its structure (pore size, pore shape, etc.), which determines the selectivity of the zeolite for particular reactions, and the acid sites, which determine the catalytic activity of the zeolite. The internal micro structure as determined by x-ray diffraction defines the classification of the zeolite (as, for example, ZSM-5, ZSM-48, etc.). The catalytic activity of a particular structure can vary depending on the quantity of acid sites, i.e., the number of aluminum atoms bound in the zeolite framework: higher catalytic activity for hydrodewaxing is associated with higher aluminum content. The catalytic activity of ZSM-48 synthesized with diamines or tetramethyl ammonium compounds is limited by a relatively low percentage of aluminum content. When higher aluminum content is attempted in the prior art methods of ZSM-48 synthesis by increasing the ratio of alumina to silica in the preparation, the reaction mechanism shifts to the formation of ZSM-5 or other undesired catalysts.

It has now been found that when the crystalline zeolite ZSM-48 is prepared with a linear diquaternary ammonium compound as the organic directing agent, this zeolite, while retaining the X-ray diffraction pattern characteristic of ZSM-48, exhibits silica/alumina mole ratios over a wide range and significantly enhanced catalytic activity for the dewaxing process herein. In addition, the reaction mixture for preparing ZSM-48 in accordance with the method of U.S. Pat. No. 4,397,827, i.e., employing an organic nitrogen-containing directing agent described as a mixture of $C_2$-$C_{12}$ alkylamine and tetramethylammonium compound, requires a silica/alumina mole ratio of at least about 500 to avoid product contamination with other silicates, notably crystalline silicate ZSM-5 or ZSM-11. The improved zeolite synthesis method more fully described hereinafter allows the reaction mixture silica/alumina mole ratio to be much less than 500, e.g., as low as about 100, to produce relatively pure ZSM-48, and as such, is a preferred method for preparing the ZSM-48 catalyst employed in the process of this invention. It is noted, however, that the reaction mixture silica/alumina mole ratio in this improved method is critical, since at less than about 100, a different crystalline silicate tends to form in place of the ZSM-48.

Figure 2:
FIG. 2 is a photomicrograph illustrating the crystal morphology of ZSM-48 prepared with a tetramethyl ammonium compound as the directing agent.

Moreover, the zeolite ZSM-48 prepared by the method of the present invention, while exhibiting the same x-ray characteristics and internal microstructure of prior known ZSM-48, nevertheless possesses a surprisingly different external crystal morphology or macroscopic structure. FIG. 1 is a photomicrograph of prior known ZSM-48 prepared with a diamine directing agent in accordance with the method of U.S. Pat. No. 4,423,021 (Rollmann et al.). FIG. 2 is a photomicrograph of ZSM-48 prepared with a tetramethyl ammonium compound in accordance with the procedure described in U.S. Pat. No. 4,397,827 (Chu). As can be seen from FIGS. 1 and 2, the prior known zeolite ZSM-8 possesses a rod-like or needle-like crystal morphology.

Figure 3:
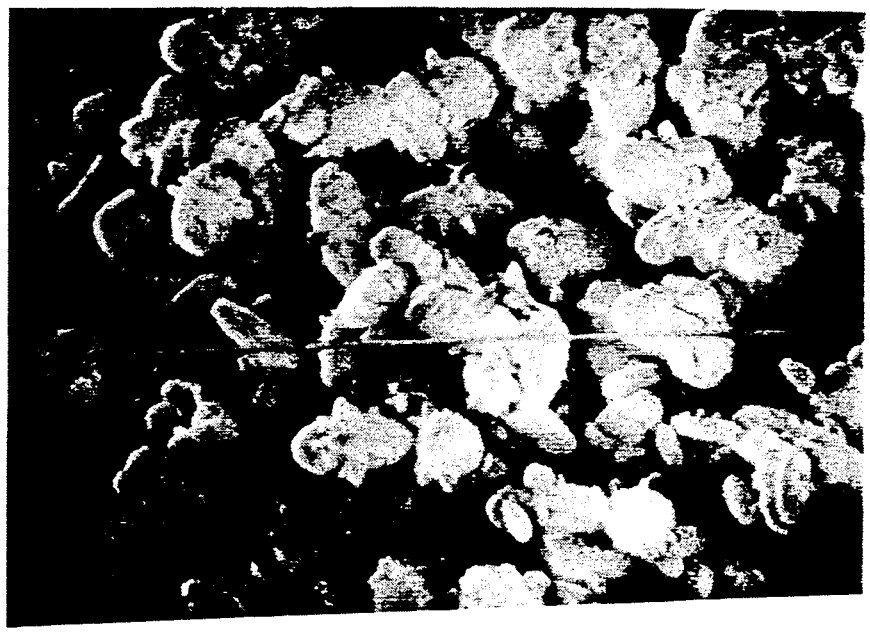
FIG. 3 is a photomicrograph of about 6700× magnification illustrating the platelet crystal morphology of ZSM-48 of the present invention prepared at high silica/alumina
Figure 4:
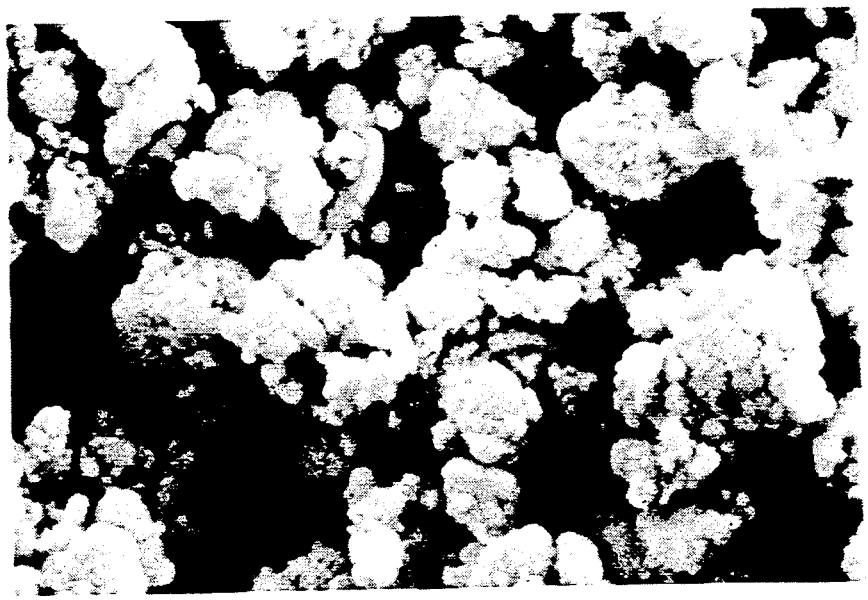
FIG. 4 is a photomicrograph of about 10,000× magnification illustrating the irregular crystal morphology of ZSM-48 of the present invention prepared at low silica/alumina ratios.

In contrast, the ZSM-48 prepared with diquaternary ammonium compound as the directing agent possesses a platelet-like crystal morphology at high silica/alumina mole ratios above about 200. FIG. 3 is a photomicrograph illustrating the crystal morphology of ZSM-48 prepared in accordance with the present method with a silica/alumina mole ratio of about 420. Silica/alumina mole ratios below 200 produce aggregates of small irregularly shaped crystals, as can be seen from FIG. 4, which is a photomicrograph of ZSM-48 prepared with a silica/alumina mole ratio of about 126.

Macroscopic crystal structure influences the packing characteristics of a catalyst: platelet type crystals are easier to stack, and easier to filter and settle. Also of significance are the environmental characteristics: needle like crystals, such as erionite, and prior art ZSM-48, have produced concern as to the health effects of inhalation over a long period of time. Therefore, the selection of a directing agent can influence catalyst composition, catalyst activity, and crystal morphology, while retaining the same X-ray diffraction characteristics and internal microstructure.

The organic directing agent required of the improved method is a linear diquaternary ammonium compound expressed by the formula:

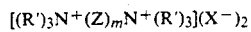

wherein R' is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; N is the quadricoordinate element nitrogen, or the heteroatom nitrogen in an alicyclic, heteroalicyclic or heteroaromatic structure; X is an anion (e.g., fluoride, chloride, bromide, iodide, hydroxide, acetate, sulfate, carboxylate, etc.); Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl; and m is 5, 6, 8, 9 or 10. When N is a heteroatom in an alicyclic, heteroalicyclic or heteroaromatic structure, such structure may be, as non-limiting examples,

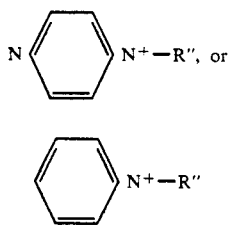

wherein R" is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

Non-limiting examples of such linear diquaternary compounds include:

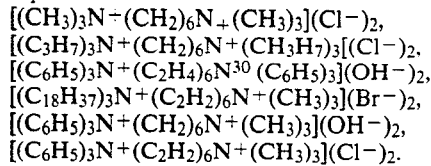

Particularly preferred diquaternary compounds have X being halide, e.g., chloride, bromide or iodide, and R' and Z being lower alkyl of 1 to 4 carbon atoms, e.g., methyl, ethyl, propyl or butyl.

Utilizing the foregoing preferred method, ZSM-48 is preferably obtained from the following crystallization reaction medium having a composition, in terms of mole ratios, falling within the following ranges:

|  | BROAD | PREFERRED |
|---|---|---|
| $SiO_2/Me_2O_3$ | at least 100 to infinity | 100 to 10,000 |
| $H_2O/SiO_2$ | 5 to 400 | 20 to 100 |
| $OH^-/SiO_2$ | 0 to 2.0 | 0.1 to 1.0 |
| $M^+/SiO_2$ | 0 to 2.0 | 0.1 to 1.0 |
| $R/SiO_2$ | 0.005 to 2.0 | 0.1 to 1.0 |

Aside from the respects already noted, the improved crystallization method employing a linear diquaternary ammonium compound as the organic directing agent can follow the synthesis procedures described in U.S. Pat. No. 4,397,827.

Acidic zeolite ZSM-48 utilized in the process of this invention is desirably employed in intimate combination with a hydrogenation component in an amount between about 0.1 and about 5 weight percent such as tungsten, vanadium, zinc, molybdenum, rhenium, nickel, cobalt, chromium, manganese, or a noble metal such as platinum or palladium. Such component can be exchanged into the composition impregnated thereon or physically intimately admixed therewith. Such component can be impregnated in or onto the zeolite such as, for example, in the case of platinum, by treating the zeolite with a platinum metal-containing ion. Thus, suitable platinum compounds include chloroplatinic acid, platinous chloride and various compounds containing the platinum amine complex. Platinum, palladium and zinc are preferred hydrogenation components.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_3)_4Cl_2$, is particularly useful.

Prior to its use, the ZSM-48 catalyst should be dehydrated at least partially. This can be done by heating to a temperature in the range of from about 200° C. to about 600° C. in an inert atmosphere, such as air, nitrogen, etc., and at atmospheric or subatmospheric pressures for between 1 and 48 hours. Dehydration can also be performed at lower temperature merely by placing the catalyst in a vacuum, but a longer time is required to obtain sufficient amount of dehydration. ZSM-48 is formed in a wide variety of particle sizes. Generally speaking, the particles can be in the form of a powder, a granule, or a molded product, such as extrudate having a particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

As in the case of many other zeolite catalysts, it may be desired to incorporate the ZSM-48 with a matrix material which is resistant to the temperatures and other conditions employed in the dewaxing process herein. Such matrix materials include active and inactive materials and synthetic or naturally occurring zeolites as well as inorganic materials such as clays, silica and/or metal oxides e.g. alumina. The latter may be either naturally occurring o in the form of gelatinous precipitates, sols or gels including mixtures of silica and metal oxides. Use of a material in conjunction with the ZSM-48, i.e., combined therewith, which is active, may enhance the conversion and/or selectivity of the catalyst herein. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g., bentonite and kaolin. These materials, i.e., clays, oxides, etc., function, in part, as binders for the catalyst. It is desirable to provide a catalyst having good crush strength since in a petroleum refinery the catalyst is often subject to rough handling which tends to break the catalyst down into powder-like materials which cause problems in processing.

Naturally occurring clays which can be composited with ZSM-48 include the montmorillonite and kaolin families which include the sub-bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, ZSM-48 can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica- alumina-magnesia and silica-magnesia-zirconia. The matrix can be in the form of a cogel. Mixtures of these components can also be used. The relative proportions of finely divided crystalline silicate ZSM-48 and inorganic oxide gel matrix vary widely with the crystalline silicate content ranging from about 1 to about 90 percent by weight, and more usually in the range of about 2 to about 80 percent by weight, of the composite.

The charge stock used in the process of this invention includes hydrocracked petroleum oils boiling within the aforenoted range as well as other processed heavy oils whether derived from tar sands, coal or from other sources. The boiling points herein referred to ar boiling points at atmospheric pressures and may be determined by vacuum assay in a manner known to those skilled in the art.

In a preferred embodiment of this invention, a viscous distillate fraction of crude petroleum oil isolated by vacuum distillation of a reduced crude from atmospheric distillation is solvent refined by counter current extraction with at least an equal volume (100 volume percent) of a selective solvent such as furfural. It is preferred to use from about 1.5 to about 2.5 volumes of solvent per volume of oil. The raffinate is then subjected to catalytic dewaxing by mixing with hydrogen an contacting at elevated temperature with a catalyst comprising zeolite ZSM-48, preferably associated with a hydrogenation component as previously described.

In some instances, it may be desirable to partially dewax the solvent-refined stock by conventional solvent dewaxing techniques prior to catalytic dewaxing. The higher melting point waxes so removed are those of greater hardness and higher market value than the waxes removed in taking the produce to a still lower pour point.

In general, hydrodewaxing conditions include a temperature between about 500° and about 850° F., a pressure between about 100 and about 3000 psig and preferably between about 200 and about 1000 psig. The liquid hourly space velocity is generally between about 0.1 and about 10 and preferably between about 0.5 and about 4 and the hydrogen to feedstock ratio is generally between about 400 and about 8000 and preferably between about 800 and about 4000 standard cubic feet (scf) of hydrogen per barrel of feed.

The catalytic dewaxing process of this invention can be conducted by contacting the feed to be dewaxed with a fixed stationary bed or with a transport bed of the ZSM-48 catalyst, as desired. A simple, and therefore preferred, configuration is a trickle-bed operation in which the feed is permitted to trickle through a stationary fixed bed, preferably in the presence of hydrogen. With such a configuration, it is of considerable importance in order to obtain the benefits of this invention to initiate the reaction with fresh catalyst at a temperature of less than about 600° F. This temperature is, of course, raised as the catalyst ages in order to maintain catalytic activity. In general, the run is terminated at an end-of-run temperature less than about 750° F., at which time the catalyst can be regenerated by contact at elevated temperature with hydrogen gas, for example.

With respect to the catalyst composition, dewaxing of unhydrotreated stock requires a $SiO_2/Al_2O_3$ mole ratio of no more than about 170, or more broadly about 250. For hydrotreated or mildly hydrocracked stock the maximum $SiO_2/Al_2O_3$ ratio may be raised to about 500.

In the examples of the invention which follow, Example 1 illustrates the preparation of acidic zeolite ZSM-48 employing the preferred method described above and Example 2 illustrates the catalytic dewaxing process employing the resulting zeolite of Example 1.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant = 0.016 sec$^{-1}$). The Alpha Test is described in U.S. Pat. No. 3,354,078; in the *Journal of Catalysis*, vol. 4, p. 527 (1965); vol. 6, p. 278 (1966); and vol. 61, p. 395 (1980), each incorporated herein by reference as to that description. The experimental condition of the test used herein include a constant temperature of 538° C. and a variable flow rate as described in detail in the *Journal of Catalysis*, vol. 61, p. 395.

EXAMPLE 1

The linear diquaternary ammonium compound employed in this zeolite crystallization example (Diquat 6) has the structure $$[(CH_3)_3N^+(CH_2)_6N^+(CH_3)_3](I^-)_2$$

and was prepared by refluxing N,N-tetramethyl-1,6-hexanediamine overnight with excess methyliodide in absolute ethanol followed by quenching of the reaction mixture in a dry ice-acetone bath to −20° C. prior to filtration of the crystalline product.

Q-brand sodium silicate (PQ Corporation: 27.8% $SiO_2$; 8.4% $Na_2O$; 63.8% $H_2O$; 200 ppm Al) and colloidal silica sol (30% $SiO_2$) were used as the silica sources, while $Al_2(SO_4)_3 \cdot XH_2O$ and sodium aluminate were employed as the alumina sources in the crystallization. A typical mixture was prepared as follows:

A solution A was prepared by dissolving 863.3 g of Q-brand sodium silicate in 1500 g of deionized water. After the sodium silicate dissolution was complete, 182.48 g of the salt Diquat-6$I_2$ (the organic directing agent, R) was dissolved in the silicate solution.

Another solution B was prepared by dissolving 12.12 g $Al_2(SO_4)_3 \cdot 18H_2O$ and 71.15 g conc. $H_2SO_4$ in 826.32 g deionized water.

Solutions A and B were then mixed directly into a one-liter stainless-steel autoclave until the hydrogel was of uniform consistency. The composition of the aluminosilicate hydrogel produced possessed the following mole ratios:

| $\dfrac{SiO_2}{Al_2O_3}$ | $\dfrac{H_2O}{SiO_2}$ | $\dfrac{OH^-}{SiO_2}$ | $\dfrac{Na^+}{SiO_2}$ | $\dfrac{R}{SiO_2}$ |
|---|---|---|---|---|
| 220 | 40 | 0.20 | 0.59 | 0.10 |

Zeolite synthesis was carried out over a period of 24 hours in a 1000 ml stirred (400 rpm) stainless-steel autoclave operating at 160° C. at autogenous pressure. At the termination of the run, the autoclave was quenched in a water-ice bath prior to filtration of the ZSM-48 aluminosilicate. After washing and drying under an infrared heat lamp, the crystalline product was submitted for x-ray powder diffraction scans which confirmed its structure as that of ZSM-48. A sample of the product zeolite was also submitted for chemical analysis. The product zeolite possessed a $SiO_2:Al_2O_3$ ratio of 170 and contained 0.78 weight percent sodium in the as-synthesized form.

The zeolite was then calcined in flowing air at a heating rate of 1° C./min to 538° C. and held at this temperature for 12 hours to remove the organic directing agent. Approximately 11 grams of the calcined zeolite was placed in a beaker and ion exchanged with 55 ml of 1.0N $NH_4Cl$ which had been neutralized to a pH of 8 by titration with $NH_4OH$. The zeolite was then rinsed twice with 200 ml of deionized water, dried and reexchanged with 1.0N $NH_4Cl$ employing the same procedure. Following the drying step, the zeolite was calcined in air at 1° C./min to 538° C. and held at this temperature for one hour to convert the zeolite to the hydrogen form.

The entire exchange and calcination procedure was then carried out a second time to reduce the Na content of the zeolite to a low level. Sodium analysis (via Atomic Adsorption Spectrophotometry) showed the Na level of the exchanged and calcined zeolite to be 35 ppm. This material had an alpha value of 23. Eight Grams of the foregoing zeolite was admixed with 4.2 grams of powdered 0.5 weight percent $Pd/Al_2O_3$ catalyst ("Girdler T-368D Palladium on Gamma Alumina" from The Chemtron Corporation—Catalyst Division). The physical mixture was then ground in a mortar and pestle and pelleted using a conventional tabletting machine. The resulting tablets were ground and sieved to 14/40 mesh (Tyler).

EXAMPLE 2

The combined ZSM-48 and $Pd/Al_2O_3$ catalyst from Example 1 was loaded into a ½" ID microreactor and presulfided with a 2% $H_2S$/98% $H_2$ mixture overnight at 650° F. The catalyst was then streamed with an Arab Light light neutral raffinate at 0.5 LHSV, 400 psig and 2500 scf $H_2$/BBL at an initial temperature of 496° F. Properties of the Arab Light light neutral raffinate are given in Table 2 as follows:

TABLE 2:

| Properties of Arab Light Neutral Raffinate | |
|---|---|
| | Total |
| H-NMR, % | 13.6 |
| Nitrogen (ppm) | 49.0 |
| Sulfur, % | 0.930 |
| API Gravity | 30.4 |
| Refractive Index | 1.464 |
| Flash Point (Cleveland Open Cup) | 446 |
| Total Acid No. | 0.12 |
| Bromine No. | 0.9 |
| KV @ 100° C., cs | 5.553 |
| KV @ 300° F., cs | 2.489 |
| Furfural (ppm) | 7.0 |
| Metals | |
| Iron | 0.6 |
| Copper | 0.04 |
| Sodium | 5.0 |

The reactor temperature was then raised progressively over the next 26 days to attain and maintain a 20° F. pour point product. The lube properties of the hydrodewaxed products are set forth in Table 3 as follows:

TABLE 3

| Properties of the Hydrodewaxed Products | | | | | |
|---|---|---|---|---|---|
| Product No. | 1 | 2 | 3 | 4 | 5 |
| Reactor temp., °F. | 655 | 667 | 675 | 675 | 675 |
| LHSV | 0.54 | 0.54 | 0.54 | 0.54 | 0.54 |
| Days on Stream | 8 | 9 | 11 | 12 | 13 |
| Pour Point, °F. | | | | | |
| Herzog | 37 | 23 | 20 | 20 | 23 |
| ASTM D-97 | 45 | 25 | 20 | 25 | 25 |
| KV @ 40° C., cs | 32.44 | 44.57 | 33.19 | 33.31 | 32.70 |
| KV @ 100° C., cs | 5.507 | 5.574 | 5.523 | 5.543 | 5.489 |
| Cloud Pt, °F. | 56 | 40 | 28 | 27 | 44 |
| Lube Yield, wt % | 91.9 | 85.2 | 81.0 | 83.1 | 85.9 |
| V.I. | 105.7 | 102.7 | 102.1 | 102.5 | 103.1 |

Figure 5:
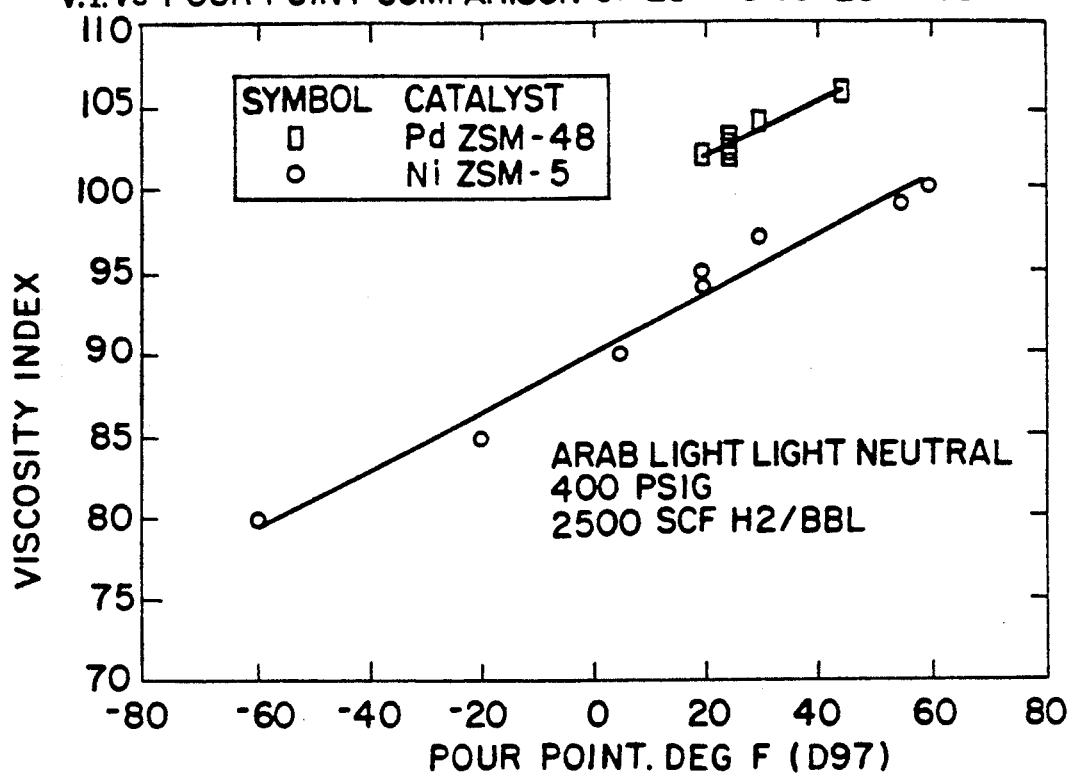
FIG. 5 is a graphical comparison of V.I. versus pour point for ZSM-5 versus ZSM-48 in a hydrodewaxing operation carried out under substantially similar conditions with both catalysts.

FIG. 5 shows the VI vs pour point response of the ZSM-48 catalyst and compares this to a conventional Ni/ZSM-5 catalyst for dewaxing the same feedstock. The conditions used in the ZSM-5 hydrodewaxing run were essentially the same except that the liquid hourly space velocity (LHSV) was maintained at 1.0 $hr^{-1}$ instead of 0.5 $hr^{-1}$. This data demonstrates that the ZSM-48 catalyst produces a higher viscosity index material than ZSM-5 at equivalent pour points.

Figure 6:
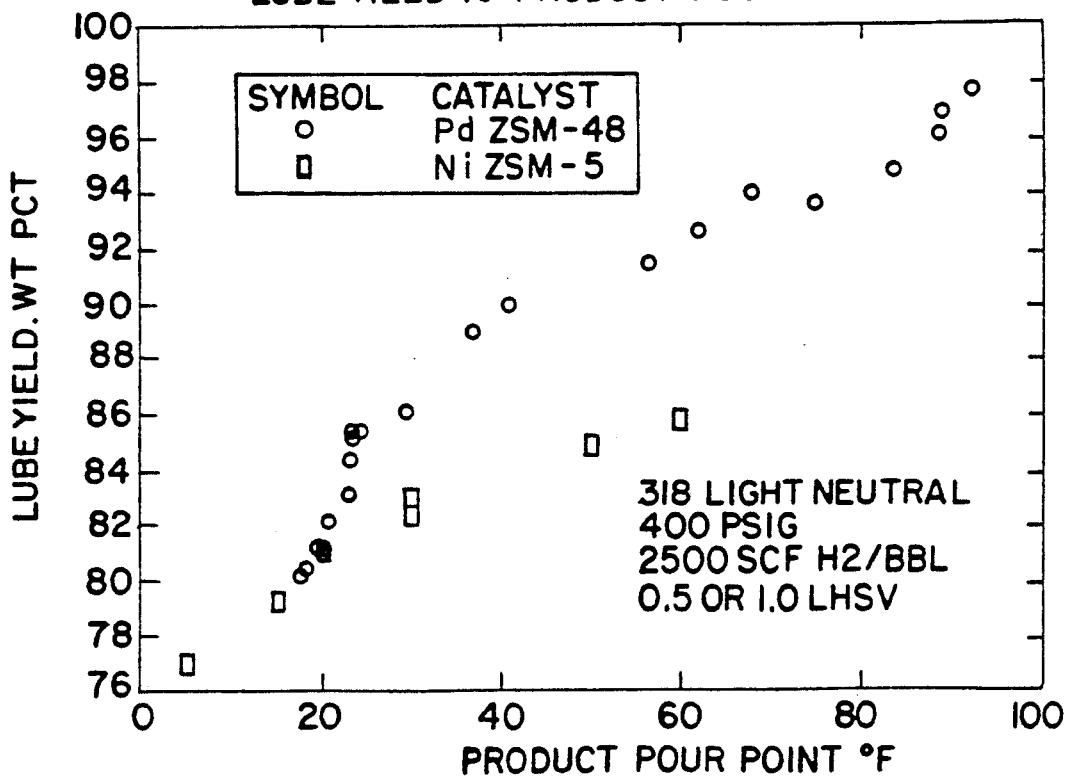
FIG. 6 is a graphical comparison of lube yield versus product pour point for ZSM-5 versus ZSM-48 in said hydrodewaxing operation; and, FIG. 7 is a graphical summary of aging rate data for ZSM-48 in said hydrodewaxing operation.
Figure 7:
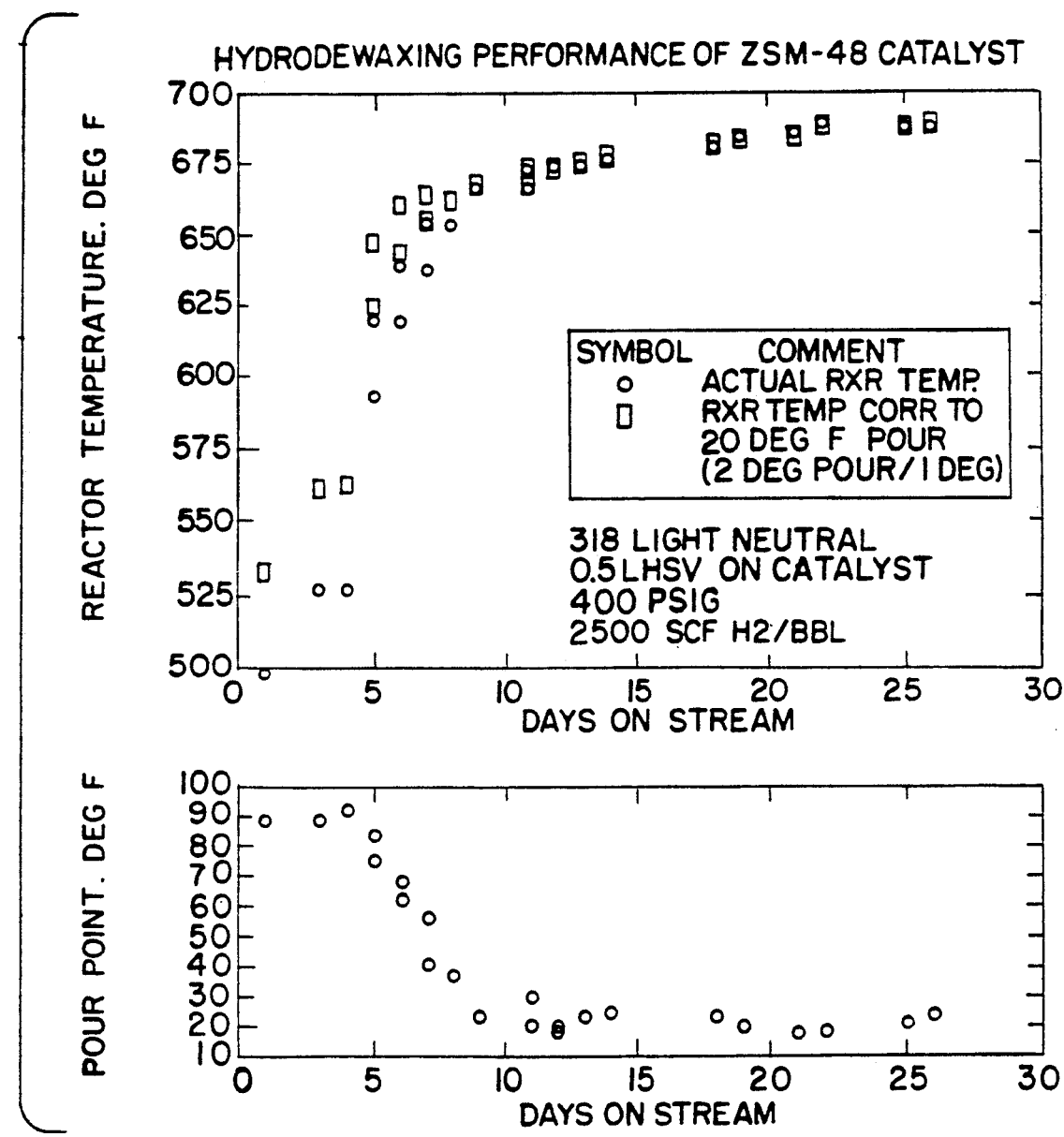

Additional data are plotted in FIG. 6 and compare the lube yield vs product pour point data for the ZSM-48 and ZSM-5 catalysts. These data show that the lube yields from both catalysts are equivalent at the target 20° F. pour point although there is an apparent yield advantage for the ZSM-48 catalyst at higher pour points. FIG. 7 summarizes the aging rate data from the ZSM-48 hydrodewaxing run.

EXAMPLE 3

ZSM-48 was synthesized according to procedures described in Rollmann et al. U.S. Pat. No. 4,423,021 as follows:

The following solutions were prepared:
Solution A:
6.6 g of concentrated $H_2SO_4$ was added dropwise with stirring to 85.0 g of deionized $H_2O$, followed by 6.1 g of 1,4-butanediamine as the organic templating agent.
Solution B:
50.0 g of Q-Brand sodium silicate (27.8% $SiO_2$; 8.4% $Na_2O$; 63.8% $H_2O$; 200 ppm Al) was stirred into 50.0 g deionized $H_2O$.

Solutions A and B were mixed directly into an autoclave equipped with a stirrer. The reaction mixture was stirred for 2 minutes before sealing the autoclave. Heating and stirring o the autoclave were begun immediately. The mixture was crystallized for seven days at 160° C., with stirring (400 rpm) before quenching the autoclave in an ice water bath. The resulting crystalline product was filtered, washed with deionized water and dried in an air stream under an infrared lamp. The dried product was analyzed to be 100% zeolite ZSM-48.

The as-synthesized zeolite was then calcined in flowing air at a heating rate of 1° C./min to 538C and held at this temperature for 12 hours to remove the templating agent. Approximately 11 grams of this calcined zeolite was placed in a beaker and ion exchanged with 55 ml of 1.0N $NH_4Cl$ which had been neutralized to pH 8 by titration with NH₄OH. This zeolite was then rinsed twice with 20 ml of deionized water dried and reexchanged with 1.0N NH₄Cl using the same procedure. Following the drying step, the zeolite was calcined in air at 1° C./min to 538° C. in air and held in air at this temperature for one hour to convert the zeolite to the hydrogen form. The foregoing exchange and calcination procedure was repeated to reduce the Na content of the zeolite to 49 ppm. The zeolite had an alpha value of 7. The zeolite was then tabletted and crushed to provide 5.6 cc (3.4 grams) of 14/40 mesh catalyst.

The foregoing ZSM-48 catalyst was loaded into a ½" ID microreactor and then streamed with the same Arab Light light neutral raffinate as in Example 2 of the subject application under the same hydrodewaxing conditions set forth therein, i.e., 0.5 LHSV, 400 psig and 2500 scf H₂BBL at an initial temperature of 496° F. The reactor temperature was then raised progressively over the next 16 days in an attempt to achieve a 20° F. pour point product. The table below compares reaction temperature vs. lubricating oil Pour Point obtained with the ZSM-48 catalyst prepared according to Example 1 of the subject application and that obtained with the ZSM-48 catalyst prepared as described above, i.e., by the procedures described in Rollmann et al. U.S. Pat. No. 4,423,021.

TABLE 4

Comparison of Reaction Temperature vs. Pour Point Response of ZSM-48 Catalysts Prepared By Different Procedures

| ZSM-48 Catalyst From Example 1 Herein | | | ZSM-48 Catalyst Of This Paragraph | | |
|---|---|---|---|---|---|
| Days on Stream | Reaction Temp. (°F.) | Pour Pt. (°F.) | Days on Stream | Reaction Temp. (°F.) | Pour Pt. (°F.) |
| 1 | 498 | 89 | 1 | 495 | 99 |
| 3 | 527 | 90 | 2 | 538 | 97 |
| 4 | 529 | 93 | 5 | 579 | 98 |
| 5 | 594 | 84 | 6 | 628 | 92 |
| 6 | 621 | 68 | 7 | 673 | 92 |
| 7 | 639 | 57 | 12 | 730 | 91 |
| 8 | 655 | 41 | 13 | 731 | 89 |
| 9 | 667 | 23 | 14 | 731 | 87 |
| 11 | 675 | 20 | 15 | 754 | 71 |
| 12 | 675 | 18 | | | |
| 13 | 674 | 23 | | | |
| 15 | 680 | 23 | | | |
| 18 | 680 | 23 | | | |
| 19 | 683 | 19 | | | |
| 21 | 685 | 18 | | | |
| 22 | 689 | 17 | | | |
| 25 | 687 | 21 | | | |
| 26 | 687 | 23 | | | |

As the data in the above table show, the use of ZSM-48 catalyst prepared as described in Example 1 of the application in hydrodewaxing provided superior results, expressed in terms of reduced pour point, compared to ZSM-48 catalyst prepared in accordance with Rollmann et al. U.S. Pat. No. 4,423,021.

EXAMPLE 4

A ZSM-48 sample was synthesized in a one-gallon autoclave using Diquat-6 [(CH₃)₃N+(CH₂)₆N+(CH₃)₃](I⁻)₂ as the directing agent. The sample had a SiO₂/Al₂O₃ ratio of 170 (Al₂O₃ content = 1.01 wt. %) and contained 0.78 wt. % Na in the assynthesized form. The synthesis technique used for producing this sample is described in Example 1.

The ZSM-48 sample prepared in accordance with the procedure described in Example 1 was calcined in flowing air at a heating rate of 1° C./min to 538° C. and held at this temperature for 12 hours to remove the organic directing agent. Approximately 11 grams of this calcined zeolite was placed in a beaker and ion exchanged with 55 ml of 1.0N NH₄Cl that had been neutralized to pH = 8 by titration with NH₄OH. This zeolite was then rinsed twice with 20 ml of deionized water, dried and reexchanged with 1.0N NH₄Cl using the same procedure. Following the drying step, the zeolite was calcined in air at 1° C./min to 538° and held at this temperature in air to convert the zeolite to the hydrogen form.

The entire exchange and calcination procedure was then carried out a second time to reduce the Na content of the zeolite to a low level. Sodium analysis (via Atomic Adsorption Spectrometry) showed the Na level of the exchanged and calcined zeolite to be 35 ppm. This material had an alpha of 23.

Eight grams of the zeolite (96.2% ash) was mixed with 4.2 grams of a powdered commercial 0.5% Pd/Al₂O₃ catalyst (99.1% ash). The Pd/Al₂O₃ catalyst was produced by the Chemtron Corporation—Catalysts Division and had the designation "Girdler T-368D Palladium on Gamma Alumina". This physical mixture was then ground in a mortar and pestle and pelleted using a conventional tabletting machine. The resulting tablets were crushed and sieved to 14/40 mesh (Tyler).

EXAMPLE 5

The ZSM-48+Pd/Al₂O₃ catalyst from Example 4 was loaded into a ½-inch ID microreactor and presulfided with 2% H₂S/98% H₂ mixture overnight at 650° F. The catalyst was then streamed with Arab Light light neutral raffinate at 0.5 LHSV, 400 psig, 2500 scf H₂/BBL at an initial temperature of 496° F. Properties of the Arab Light light neutral raffinate are given in Table 2. The reactor temperature was then raised progressively over the next 26 days to attain and maintain a 20° F. pour point product. The data are summarized below in Table 5.

EXAMPLE 6

ZSM-48 was synthesized according to the procedures described in U.S. Pat. No. 4,423,021.

Two solutions were mixed for the zeolite synthesis:
Solution A:
6.6 g of concentrated H₂SO₄ was added dropwise with stirring to 85.0 g of the deionized H₂O, followed by 6.1 g of 1,4-butanediamine. The butanediamine is the organic directing agent.
Solution B:
50.0 g of Q-Brand sodium silicate (27.8 wt. % SiO₂, 8.4 wt. % Na₂O, 63.8 wt. % H₂O, 200 ppm Al) was stirred into 50.0g of deionized H₂O.

Solutions A and B were mixed directly into a 300 ml stainless steel autoclave, equipped with a stirrer. The reaction mixture was stirred for 2 minutes before sealing the autoclave. Heating an stirring of the autoclave were begun immediately. The hydrogen was crystallized for seven days at 160° C. with stirring (400 rpm), before quenching the autoclave in an ice-water bath.

The crystalline product formed was filtered on a Buchner funnel, washed with deionized water, then dried in an air stream under an infrared lamp. The dried product was submitted to X-ray diffraction analysis which showed it to be 100% crystalline zeolite, ZSM-48.

EXAMPLE 7

The zeolite of Example 6 was calcined in flowing air at a heating rate of 1° C./min to 538° C. and held at this temperature for 12 hours to remove the organic directing agent. Approximately 11 grams of this calcined solvent was placed in a beaker and ion exchanged with 55 ml of a 1.0N $NH_4Cl$ solution that had been neutralized to pH = 8 by titration with $NH_4OH$. This zeolite was then rinsed twice with 20 ml of deionized water, dried at 250° F, and reexchanged with 1.0N $NH_4Cl$ solution using the identical procedure. Following the drying step, the zeolite was calcined in air at 1° C./min to 538° C. and held at this temperature in air for one hour to convert the zeolite to the hydrogen form.

The entire exchange and calcination procedure was then carried out a second time to reduce the Na content of the zeolite to a low level. Sodium analysis (via Atomic Adsorption Spectrometry) showed that the Na level of the exchanged and calcined zeolite to be 49 ppm. This material had an $Al_2O_3$ content of 0.17 wt. % and a $SiO_2$ content of 91.05 wt. % ($SiO_2/Al_2O_3 = 910$) with the remainder being water. This material had an alpha of 7.

EXAMPLE 8

Example 10.3 g of the zeolite from Example 7 (95.4% ash) was admixed with 5.36 g of the same powdered commercial 0.5% $Pd/Al_2O_3$ catalyst (99.1% ash) described in Example 4. This physical mixture was then ground in a mortar and pestle and pelleted using a conventional tabletting machine. The resulting tablets were crushed and sieved to 14/40 mesh (Tyler).

EXAMPLE 9

The ZSM-48 + $Pd/Al_2O_3$ catalyst of Example 8 was loaded into a ½-inch ID microreactor in the same fashion as described in Example 5 and presulfided with a 2% $H_2S/98\%$ $H_2$ mixture overnight at 650° F. The catalyst was then streamed with the same Arab Light light neutral (150 SUS) feedstock used in Example 5 at 0.5 LHSV, 400 psig, 2500 scf $H_2$/BBL at an initial temperature of 498° F. The reactor temperature was then raised progressively over the next seven days in an attempt to obtain a 20° F. pour point material. The data in Table 5 show that even at temperatures as high as 735° F. this catalyst could not produce the required pour point reduction.

TABLE 5

Comparison of the Temperature vs Pour Point Responses of Catalysts Prepared According To Examples 4 and 8 Hydrodewaxing the Same Light Neutral Raffinate Stock at 400 psig, 2500 scf $H_2$/BBL and 0.5 LHSV

| Catalyst from Example 4 | | Catalyst from Example 8 | |
| --- | --- | --- | --- |
| $SiO_2/Al_2O_3$ of ZSM-48 Component | | | |
| 170 | | 910 | |
| Days on Stream | Rxr Temp. (°F.) | Pour Pt. (°F.) | Days on Stream | Rxr Temp. (°F.) | Pour Pt. (°F.) |
| 1 | 498 | 89 | 1 | 495 | 98 |
| 3 | 527 | 90 | 3 | 642 | 90 |
| 4 | 529 | 93 | 5 | 658 | 95 |
| 5 | 594 | 84 | 6 | 675 | 89 |
| 6 | 621 | 68 | 7 | 735 | 85 |
| 7 | 639 | 57 | | | |
| 8 | 655 | 41 | | | |
| 9 | 667 | 23 | | | |

TABLE 5-continued

Comparison of the Temperature vs Pour Point Responses of Catalysts Prepared According To Examples 4 and 8 Hydrodewaxing the Same Light Neutral Raffinate Stock at 400 psig, 2500 scf $H_2$/BBL and 0.5 LHSV

| 11 | 675 | 20 |
| 12 | 675 | 18 |
| 13 | 674 | 23 |
| 15 | 680 | 23 |
| 18 | 680 | 23 |
| 19 | 683 | 19 |
| 21 | 685 | 18 |
| 22 | 689 | 17 |
| 25 | 687 | 21 |
| 26 | 687 | 23 |

Comparison of pour point reduction of the prior art catalyst with added palladium (Table 5) and without added palladium (Table 4) illustrates that the palladium has no effect on pour point reduction. Palladium normally extends the longevity or cycle life of zeolites but does not add to hydrodewaxing activity.

What is claimed is:

1. A process for preparing a porous silico-crystal characterized by an X-ray diffraction pattern whose values are set forth in Table 1 of the specification which comprises:

preparing a reaction mixture containing a source of silica, a source of trivalent metal oxide corresponding to the formula $Me_2O_3$, an alkali metal oxide, an organic linear diquaternary ammonium compound, and water, and having a composition in terms of mole ratios falling within the following ranges:

$SiO_2Me_2O_3 = 100$ to infinity
$H_2O/SiO_2 = 5$ to 400
$OH/SiO_2 = )$ to 2.0
$M + SiO_2 = 0$ to 2.0
$R/SiO_2 = 0.005$ to 2.0 wherein Me is a trivalent metal, M is an alkali metal, and R is an organic linear diquaternary ammonium compound, said organic linear diquaternary ammonium compound corresponding to the formula $$[(R')_3N^+(Z)_mN^+(R')_3](X^-)_2$$

wherein R' is alkyl of from 1 to 20 carbon atoms, Z is a bridging member selected from the group consisting of alkyl of from 1 to 20 carbon atoms, and m is 5, 6, 8, 9 or 10.

2. The process of claim 1 wherein $Me_2O_3$ is an oxide of at least one metal selected from the group consisting of aluminum, titanium, iron, chromium, zirconium, vanadium, molybdenum, arsenic, antimony, manganese, gallium, germanium, boron, or combination thereof.

3. The process of claim 1 wherein the trivalent metal oxide comprises aluminum oxide.

4. The process of claim 1 wherein X is halide and R' and 2 are allyl of 1 to 4 carbon atoms.

5. The process of claim 4 wherein the halide is iodide or bromide, R' is methyl, and Z is methylene.

6. A composition comprising a substantially pure silico-crystal ZSM-48 prepared with an organic linear diquaternary ammonium compound as the directing agent and having a silica/alumina mole ratio of from 100 to 250.

7. The composition of claim 6 wherein said ZSM-48 is prepared from a reaction mixture containing a source of silica, a source of trivalent metal oxide corresponding to the formula $Me_2O_3$, an alkali metal oxide, an organic linear diquaternary ammonium compound, and water, and having a composition in terms of mole ratios falling within the following ranges:

$SiO_2/Me_2O_3 = 100$ to $250$
$H_2O/SiO_2 = 5$ to $400$
$OH^-/SiO_2 = 0$ to $2.0$
$M^+/SiO_2 = 0$ to $2.0$
$R/SiO_2 = 0.005$ to $2.0$ wherein Me is a trivalent metal, M is an alkali metal, and R is an organic linear diquaternary ammonium compound.

8. The composition of claim 7 wherein the trivalent metal oxide comprises aluminum oxide.

9. The composition of claim 6 wherein the organic linear diquaternary ammonium compound corresponds to the formula $$[(R')_3N^+(Z)_mN^+(R')_3](X^-)_2$$

wherein R' is alkyl of from 1 to 20 carbon atoms, N is the quadricoordinate element nitrogen, X is an anion; Z is a bridging member selected from the group consisting of alkyl of from 1 to 20 carbon atoms, and m is 5, 6, 8, 9 or 10.

10. A silico-crystal ZSM-48 prepared with an organic linear diquaternary ammonium compound as the directing agent and having a platelet crystal morphology.

11. A silico-crystal ZSM-48 prepared with an organic linear diquaternary ammonium compound as the directing agent and having an irregular crystal morphology.

* * * * *

UNITED STATES PATENT AND TRADEMARK OFFICE
CERTIFICATE OF CORRECTION

PATENT NO. : 5,075,269

DATED : December 24, 1991

INVENTOR(S) : G.W. Kirker et al.

It is certified that error appears in the above-identified patent and that said Letters Patent is hereby corrected as shown below:

Col. 16, claim 1, line 35, ")" should be --O--

Col. 16, claim 4, line 57, "2" should be --Z--

Col. 16, claim 4, line 57, "allyl" should be --alkyl--

Signed and Sealed this

Twenty-seventh Day of April, 1993

*Attest:*

*Attesting Officer*

MICHAEL K. KIRK

*Acting Commissioner of Patents and Trademarks*